(12) United States Patent  (10) Patent No.: US 8,157,297 B2
Spilbor et al.  (45) Date of Patent: Apr. 17, 2012

(54) PRACTICE APPARATUS FOR TYING KNOTS

(75) Inventors: James Spilbor, Stormville, NY (US);
Claudinei Moreira, Trumbull, CT (US);
Pete Monteleone, Pawling, NY (US)

(73) Assignee: Know Your Knot, LLC, Pawling, NY (US)

( * ) Notice: Subject to any disclaimer, the term of this patent is extended or adjusted under 35 U.S.C. 154(b) by 0 days.

(21) Appl. No.: 12/779,296

(22) Filed: May 13, 2010

(65) Prior Publication Data

US 2011/0278842 A1    Nov. 17, 2011

(51) Int. Cl.
*D03J 3/00* (2006.01)
(52) U.S. Cl. .................................................. 289/17
(58) Field of Classification Search ............... 289/2, 13, 289/17, 18.1; 434/258, 260; D19/59, 62, D19/64
See application file for complete search history.

(56) References Cited

U.S. PATENT DOCUMENTS

| | | | |
|---|---|---|---|
| 2,385,197 A | 9/1945 | Eisel | |
| 2,624,957 A * | 1/1953 | Collins | 434/260 |
| 4,003,592 A * | 1/1977 | Schreves | 289/16.5 |
| 4,045,061 A * | 8/1977 | Fierro | 289/16.5 |
| 4,607,869 A * | 8/1986 | Bersche | 289/17 |
| 4,613,173 A * | 9/1986 | Rosser | 289/17 |
| 5,261,343 A | 11/1993 | Elterman et al. | |
| 5,690,369 A | 11/1997 | Steck, III | |
| 5,690,370 A | 11/1997 | Steck, III | |
| 6,217,086 B1 | 4/2001 | LeTourneau | |
| D450,770 S * | 11/2001 | Starkey | D19/62 |
| 6,412,833 B2 | 7/2002 | Lusk et al. | |
| 6,485,065 B2 | 11/2002 | Lusk et al. | |
| 6,485,307 B1 | 11/2002 | Mestyanek | |
| 6,872,079 B1 * | 3/2005 | Herndon | 434/258 |
| 7,419,195 B1 | 9/2008 | Jochum | |
| 7,488,011 B2 * | 2/2009 | Seo et al. | 289/2 |
| 2008/0265576 A1 | 10/2008 | May-Newman et al. | |
| 2010/0019495 A1 | 1/2010 | Oliveto | |

OTHER PUBLICATIONS

Center for Microbial Oceanography: Research and Education, C-More Science Kits, "Nautical Knots and Maritime Careers," http://cmore.soest.hawaii.edu/education/teachers/documents/nautical_knots_and_careers_all_materials_hawaii.pdf, 24 pages (date unknown).

* cited by examiner

*Primary Examiner* — Shaun R Hurley

(74) *Attorney, Agent, or Firm* — Kenyon & Kenyon LLP

(57) ABSTRACT

An apparatus for practicing tying knots includes a base board having a horizontal upper surface, a first post coupled to the board and extending upwardly from the horizontal upper surface, a second post coupled to the board and extending upwardly from the horizontal upper surface, a crossbar extending laterally from the first post to the second post, and a rope having a first end secured to the base board and second end that is free to allow the rope to be tied to one or more of the first and second posts.

20 Claims, 4 Drawing Sheets

PRACTICE APPARATUS FOR TYING KNOTS

FIELD OF THE INVENTION

The present invention relates generally to an apparatus for practicing knot-tying.

BACKGROUND INFORMATION

Knot-tying generally requires tying a flexible material, e.g., rope, to another structure, e.g., a ring or a boat cleat, by manipulating the flexible material. Different types of knots have different properties. For example, knots vary in strength, difficulty in tying, and difficulty in untying. A knot that is improperly tied will not have the desired properties of the particular knot type. Consistently tying good knots requires skill that is developed through practice with tying specific knot types.

Further, in some contexts, e.g., when sailing, it is important not only to tie knots properly, but to tie them in an efficient and timely manner. Again, this skill is developed through practicing tying specific knots.

To achieve proficiency, it is advantageous to practice tying knots in a realistic setting. In the context of, e.g., boating or sailing, it may be inconvenient to practice tying knots on the actual structures (e.g., cleats) of the boat or dock, since the boat or dock are not easily portable or may not be readily accessible. Further, some people may be uncomfortable practicing in a public setting, such as where a boat may be docked.

Thus, it is desirable to provide a realistic practice apparatus that allows a variety of knots to be tied, e.g., in a portable and/or mountable unit that is relatively small.

Further, it is desirable to provide an apparatus that is varied and flexible in the arrangement of structures to which the knots are tied.

SUMMARY

Example embodiments of the present invention provide an apparatus that is portable, ergonomic, and provides a substantial variety of structures for tying knots.

According to example embodiments of the present invention, an apparatus for practicing tying knots includes: a base board having a horizontal upper surface; a first post coupled to the board and extending upwardly from the horizontal upper surface; a second post coupled to the board and extending upwardly from the horizontal upper surface; a crossbar extending laterally from the first post to the second, post; and a rope having a first end secured to the base board and second end that is free to allow the rope to be tied to one or more of the first and second posts.

The apparatus may include a boat cleat mounted, e.g., horizontally mounted, to the upper surface of the base board.

The apparatus may include a second rope in addition to the first rope, the second rope having a first end secured to the base board and second end that is free to allow the second rope to be tied to one or more of the first and second posts.

The apparatus may include a third post coupled to the board and extending upwardly from the horizontal upper surface, the third post being separate from the first and second posts.

The apparatus may include a boat cleat mounted, e.g., vertically mounted, to a first side surface of the third post.

The apparatus may include a ring, e.g., a ring mounted to a second side surface of the third post.

The first side surface and the second side surface may be disposed on opposite sides of the third post.

The first, second, and third posts may be detachably connected to the base board by inserting bottom portions of the first, second, and third posts into respective first, second, and third recesses in the upper surface of the base board.

The first, second, and third posts may be interchangeable among each of the first, second, and third recesses.

An upper section of the third post may include a circumferential recess having a diameter that is less than the diameters of portions of the third post immediately adjacent the circumferential recess.

The first, second, and/or third posts may be detachable from the base board.

The first, second, and/or third posts may be detachably coupled to the base board by a threaded connection.

The first, second, and/or third posts may be detachably connected to the base board by inserting bottom portions of the posts into respective first, second, and/or third recesses in the upper surface of the base board.

An upper section of the first vertical post may include a circumferential recess having a diameter that is less than the portions of the first post immediately adjacent the circumferential recess, and an upper section of the second post may include a circumferential recess having a diameter that is less than the portions of the second post immediately adjacent the circumferential recess.

The first post may include a first through-hole and the second post may include a second through-hole, the crossbar extending through the first through-hole and the second through-hole.

The crossbar may include opposite end portions each of which extends beyond a respective one of the first and second through-holes to form opposite cantilevered projections extending from the first and second posts.

Each of the posts may have a portion that is circular in horizontal cross-section, i.e., a cross-section taken through a horizontal plane intersecting the portion of the respective post.

Each of the posts may also or alternatively have a portion that is rectangular in horizontal cross-section.

The portion that is rectangular in cross section may be square in cross-section.

The base board may have a bottom surface having a pair of spaced-apart, curved recesses that extend from a front face of the base board toward a rear face of the base board.

The curved recesses may extend fully from the front face of the base board to the rear face of the base board.

According to example embodiments of the present invention, a kit for practicing tying knots includes: a base board having an upper surface and a plurality of recesses disposed in the upper surface; a first post detachably coupleable to the base board by inserting a lower portion of the first post into a first one of the recesses so that the first post extends upwardly from the upper surface of the base board; a second post detachably coupleable to the base board by inserting a lower portion of the second post into a second one of the recesses; and a rope configured to be a) tied to the first post when the first post is detachably coupled to the base board and b) tied to the second post when the second post is detachably coupled to the base board.

The kit may include a third post detachably coupleable to the base board by inserting a lower portion of the third post into a third one of the recesses.

The kit may include a crossbar detachably coupled to the first and second posts, the crossbar spanning laterally from the first post to the second post when the crossbar is detachably coupled to the first and second posts.

According to example embodiments of the present invention, an apparatus for practicing tying knots includes: a base board having a horizontal upper surface and an opposite lower surface, the lower surface having a pair of spaced-apart, curved recesses that extend from a front face of the base board toward a rear face of the base board, the recesses configured to receive respective legs of a user when the base board is supported in the user's lap; a plurality of structures detachably coupled to the upper surface of the base board; and a rope having a first end secured to the base board and second end that is free to allow the rope to be tied to one or more of the plurality of structures detachably coupled to the upper surface of base board.

Further details and aspects of example embodiments of the present invention are described in more detail below with reference to the appended figures.

DETAILED DESCRIPTION

Figure 1:
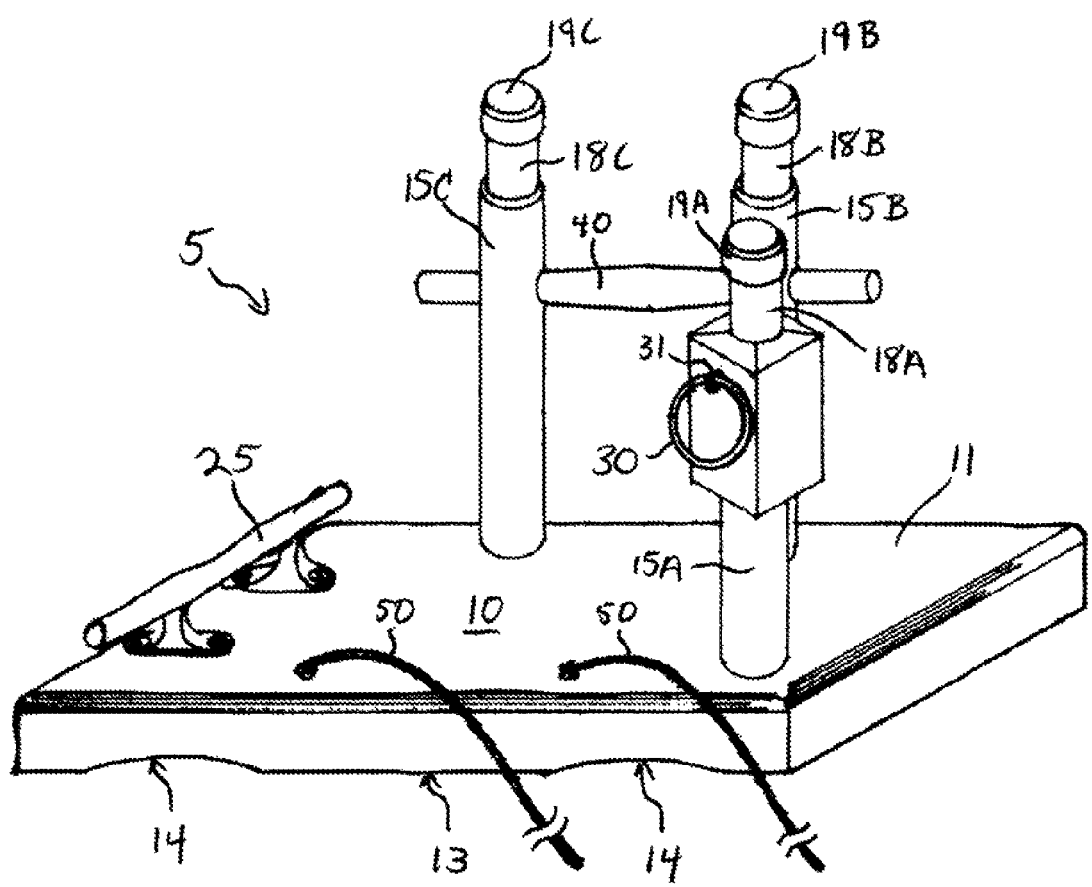
FIG. 1 is an isometric view of a practice apparatus for tying knots according to an example embodiment of the present invention.

FIGS. 1 to 5 illustrate a practice apparatus 5 including a base board 10. Mounted to a horizontal upper surface 11 of the base board 10 is a plurality of vertical shafts or posts, including a first shaft or post 15A, a second shaft or post 15B, and a third shaft or post 15C. Although each of the posts 15A, 15B, 15C extends vertically upwardly, it should be understood that any one, combination, or all of the posts 15A, 15B, 15C may extend upwardly at an angle and need not be straight. Each of the posts 15A, 15B, 15C has a generally cylindrical body with a cylindrical bottom portion 16A, 16B, 16C that fits into a corresponding recess 12 in the base board 10. The posts may be held in place by, e.g., a press or interference fit. It should be understood, however, that some or all of the posts 15 may be additionally or alternatively be secured to the board 10 by adhesive, a latching or detent mechanism, a threaded connection, and/or any other appropriate mechanism, and may be non-detachably connected to the board 10. Further, some or all of the posts 15 may alternatively be integrally (i.e., monolithically) formed with the base board 10, e.g., where the base board 10 and one or more of the posts 15 are formed by injection molding.

The first post 15A extends vertically independently of the other posts 15B and 15C. The first post 15A has a portion 17A that is square or rectangular in cross-section when viewed from above. This rectangular cross-section allows for a plurality of flat faces that facilitate the mounting of various structures to which knots may be tied. In the example embodiment illustrated in the figures, these structures are a loop or ring 30 on a first face and a vertical cleat 35 on a second face disposed on the opposite side of the post 16A. The ring 30 is attached to its respective face of the rectangular portion by a coupling 31 that allows the ring 30 to rotate about the coupling, e.g., from a vertical to a horizontal plane and/or to rotate within a given plane in which the circumference of the ring lies or extends. It should be understood that the ring 30 and/or the vertical cleat 35 (and/or any other structure that may be mounted to the post 15A) may be provided to be easily attached and removed, e.g., to allow easily replacing, repositioning, and/or swapping with different structures. Further, the cleat, the ring, and/or any other tying structure disclosed herein may be mounted at any position on the apparatus including, e.g., any appropriate surface, e.g., the upper surface, of the base board 10.

Each of the vertical posts 15A, 15B, 15C includes at a top portion a circumferential recess or reduced diameter portion 18A, 18B, 18C disposed between adjacent upper and lower portions of greater diameter. The portions above the reduced diameter portions 18A, 18B, 18C correspond to top portions or caps 19A, 19B, 19C. The reduced diameter portions 18A, 18B, 18C provide another structure around which a practice knot may be tied.

Each of the vertical posts 15B and 15C includes a through hole transverse to the respective longitudinal axes of the posts 15B and 150. These holes are dimensioned to receive respective opposite end portions of a crossbar 40. When the crossbar 40 is supported by the posts 15B and 15C, the end portions of the crossbar 40 extend beyond the through holes in the posts 15B and 15C. Thus, the crossbar 40 in combination with the posts 15B and 15C provides a plurality of structures to which practice knots may be tied. For example, knots may be tied to the portion of the crossbar 40 extending between the posts 15B and 15C or to the opposite end portions of the crossbar 40 extending beyond the posts 15B and 15C to free ends. Further, knots may be tied around the cross-shaped structure formed by the crossbar 40 and either of the posts 15B and 15C.

The crossbar 40 is laterally constrained by providing a larger cross-sectional diameter of the crossbar 40 between the posts 15B and 15C and/or by providing a larger cross-sectional diameter of the crossbar 40 at locations beyond the posts 15B and 15C toward the free ends of the crossbar 40. The larger cross section or cross-sections are greater than the diameter of the adjacent transverse hole through the post 15B, 15C, thereby laterally constraining the crossbar 40. It should be understood, however, that any appropriate mechanism, e.g., friction, may be provided to maintain the position of the crossbar 40.

In the illustrated example, the crossbar 40 is removable from the posts 15B and 15C when the posts are pulled from the base board 10. In this regard, the posts 15B and 15C may be repositioned in their respective recesses 12 without the crossbar 40 spanning therebetween. In this arrangement, each of the vertical posts 15A, 15B, 15C would be supported solely by its respective interface with the base board 10.

The recesses 12 may be provided with like dimensions to allow for the posts 15A, 15B, 15C to be repositioned among the various recesses 12. Further, since the posts provide tying structures to which practice knots are repeatedly tied, the removable interface allows for the posts (or other structures) to be replaced if they wear faster than the base board 10. Moreover, this interface allows for different types of structures to be swapped into or out of the base board 10. For example, the posts 15A, 15B, 15C, which include structures that may be specific to boating/sailing may be swapped out with structures related to other applications, e.g., scouting knots. This provides for a very flexible practice apparatus.

Moreover, the recesses 12 of the base board may be spaced apart by like or approximately equal distances. For example, the recesses 12 receiving the posts 15B and 15C in the Figures may be spaced apart by substantially the same distance between the recess 12 receiving the post 15A and the recess 12 receiving the post 15B. This may be desirable to allow one of the posts 15B and 15C to be positioned in the recess 12 illustrated as receiving post 15A, with the other of the posts 15B and 15C positioned in the recess 12 illustrated as receiving post 15B. In this arrangement the crossbar 40 would run diagonally along the right side of the base board 10 and the post 15A may be positioned in the remaining free recess 12 at the upper left portion of the base board 12. Since the spacing is the same, the crossbar 40 would maintain its proper fit between the posts 15B and 15C. Any other number of spaced arrangements of recesses may be provided to allow any desired amount of flexibility in arranging the various structures.

Further, the interface between the posts 15A, 15B, 15C and the base board 10 may allow one or more or all of the posts 15A, 15B, and 15C to be rotated about its respective longitudinal axis, either in place in the recess 12 or by removing the post 15A, 15B, 15C, rotating the post 15A, 15B, 15C, and then reinserting the post 15A, 15B, 15C into the recess 12.

Although the interface between the posts 15A, 15B, 15C and the base board 10 includes a projection of the respective post being received by a respective recess 12 in the base board 10, this configuration is merely exemplary, and any other appropriate coupling mechanism may be provided. For example, the base board 10 may have projections that extend upwardly into respective recesses of the posts. Further, a magnetic coupling and/or any other suitable coupling may be provided between the posts and the base board. Thus, it should be understood that any features described herein in relation to the recesses 12 and/or the corresponding projections of the posts 15A, 15B, 15C may be equally applied to any other attachment or coupling mechanism or configuration.

Also attached to the base board 10 is a horizontally mounted boating cleat 25, which is illustrated as being screwed into the base board 10. It should be understood that the cleat 25 may be provided with a fitting, e.g., a snapping, latching, and/or friction fitting, that allows simple removal and/or interchanging of the cleat 25 with a like or different structure. The cleat 25 (as well as the cleat 35) includes an elongated bar that is substantially parallel to the surface on which the cleat is mounted. The elongated bar is supported and spaced from the mounting surface by a pair of supports structures that extend from a mounting flange to the elongated bar. The cleat allows a realistic structure to which practice knots may be tied. Although the cleat is mounted horizontally, it should be understood that the cleat may be mounted non-horizontally.

A pair of flexible elongated ropes 50 are each attached a first end thereof to the base board 10, leaving each rope 50 with a free end to allow the rope to be tied into practice knots on the various structures described herein. The secured or non-free ends of the ropes 50 are attached to the base board 10 by attachment to a bolt that extends vertically into the thickness of the base board 10 via a hole that opens to the bottom of the base board 10. This allows a fastener, e.g., a nut, to be applied on the underside of the base board 10 to secure the bolt and the corresponding rope 50 to the base board. The extension of the bolt beyond the hole on the underside of the base board 10 is confined to a recess or counterbore/countersink to prevent the bolt or other fastener from pressing into the leg or lap of the user holding the apparatus 5, as well as allowing the apparatus to be supported on a flat surface without the bolt or other fastener contacting the surface (e.g., with the bottom surface 13 being flush with the flat surface supporting the apparatus 5). The rope 50 may be attached to the bolt by any appropriate fastening mechanism, e.g., a knot. It should be appreciated that although two ropes 50 are shown, any appropriate number of ropes may be provided, including a single rope 50 or more than two ropes 50. Further, although ropes 50 are attached by a bolt, it should be understood that any other appropriate attachment mechanism may be provided. Moreover, one or more of the ropes 50 may alternatively be attached to one of the other structures coupled to the base board 10, e.g., one of the posts 15A, 15B, 15C.

The ropes 50 may be coupled to the base board 10 (or any other structure) in a releasable manner (e.g., a snapping, screwing, or latching interface) to allow the ropes 50 to be replaced with a like rope 50 (e.g., if the rope 50 is worn or damaged) or a different rope or flexible structure. For example, although the ropes 50 are approximately six-foot lengths of nautical rope, a shorter or longer rope and/or a different type of rope may be desired at times. Thus, these different arrangements may be swapped or interchanged with the ropes 50. In some example embodiments, flexible materials other than nautical rope may be provided. For example, where the boating/sailing structures are interchanged with fishing structures, one or more lengths of fishing line may be provided. Further, varying diameters and materials for the ropes may be desired, e.g., where a scouting knot arrangement is provided.

On a bottom surface 13 of the base board 10 are a pair of recesses 14 that extend from a front face or side 20 of the base board toward a rear face or side 21 of the base board. The recesses 14 are laterally spaced apart a distance selected to correspond at least approximately to the spacing between an intended user's legs. For example, the spacing may be selected to at least approximately correspond to the distance between an average adult's legs when seated and at rest. Other recess spacings may correspond to the spacing between an average or representative person of a targeted age or age group, e.g., children within a selected age range.

Although the recesses 14 are illustrated at a predetermined spacing, it should be understood that the base board 10 may be adjustable so that the lateral spacing between the two recesses 14 is adjustable to accommodate individual users. For example, a sliding mechanism may be provided, with e.g., infinite positions between outer and inner limits and/or with predetermined positions. For example, a number of predetermined positions may be defined by a series of corresponding detents or latching positions.

Since the contours of the recesses 14 are configured to receive an upper portion of the user's legs when the apparatus 5 is supported in the user's lap, the contours allow the pressure to be more even spread out over the curvature of the user's legs, thereby reducing pressure points and related fatigue and allowing for a more ergonomic device that may be used in comfort for relatively long periods of time.

Although the recesses 14 are parallel and extend entirely through the depth of the base board 10, i.e., from the front face 20 through the rear face 21, it should be understood that the recesses 14 may extend less than the entire depth and/or may be non-parallel. However, having the recesses 14 extend entirely from the front face 20 through the back face 21 in a parallel or symmetric manner may be preferable, e.g., to allow the apparatus 5 to mate to the contours of the user's legs when the device is used in the forward position, i.e., with the front face 20 facing the user's torso when the apparatus is positioned in the user's lap, or in a reversed position where the back face 21 faces the user's torso when the apparatus is positioned on the user's lap. Moreover, although the cross-section for each of the recesses 14 is constant along the depth of the base board 10, it should be appreciated that a non-constant cross-section may be provided some or all of recesses 14.

Figure 2:
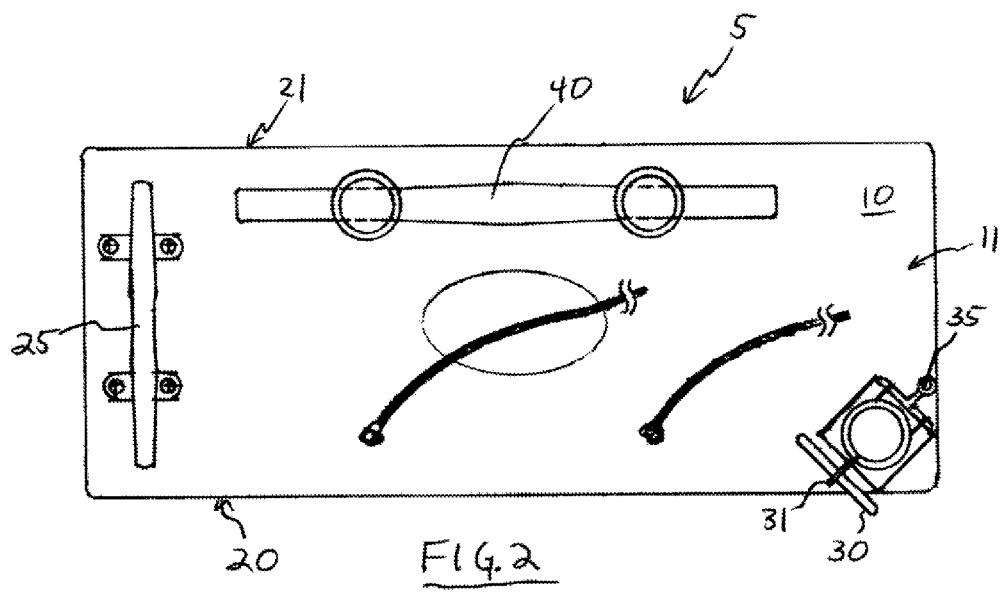
FIG. 2 is a top view of the practice apparatus of FIG. 1.
Figure 3:
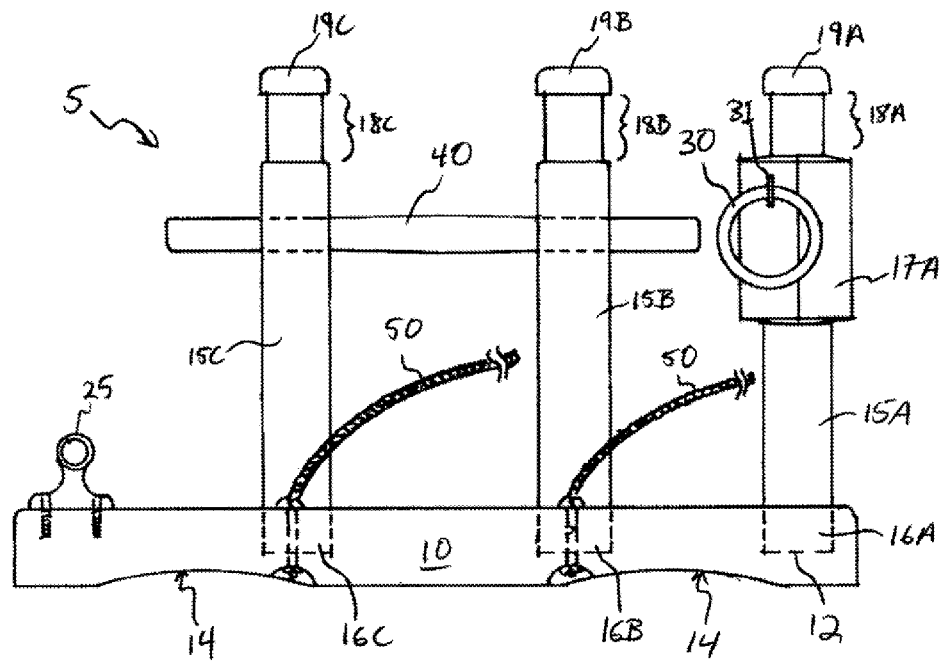
FIG. 3 is a front view of the practice apparatus of FIGS. 1 and 2.
Figure 4:
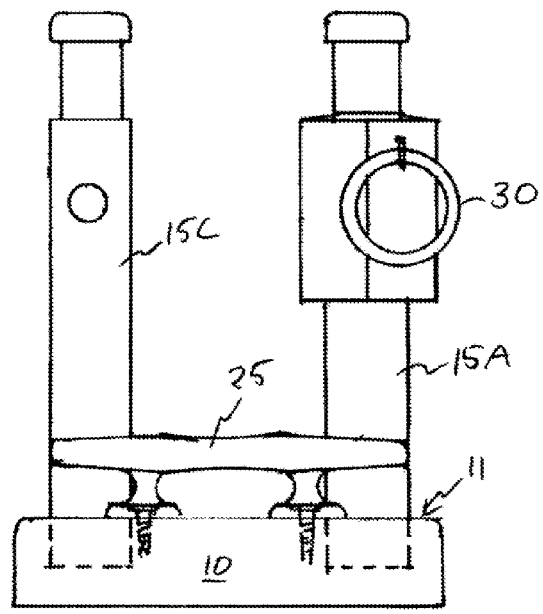
FIG. 4 is a left side view of the practice apparatus of FIGS. 1 to 3.
Figure 5:
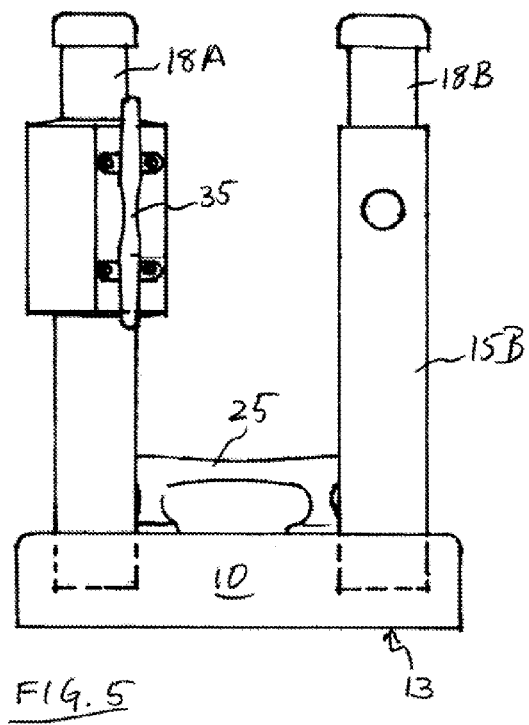
FIG. 5 is a right side view of the practice apparatus of FIGS. 1 to 4.

The base board 10 is generally rectangular when viewed from above, as illustrated in FIG. 2. However, any appropriate shape for the base board 10 may be provided. Further, although the upper surface 11 is substantially planar, it should be understood that a non-planar, e.g., curved upper surface 11 may be provided.

The base board 10 and/or the posts 15A, 15B, 15C may be formed of any suitable material. For example, the base board 10 and/or the posts 15A, 15B, 15C may be formed from wood, e.g., hardwood. Further, some or all of these elements may be formed of a polymeric material, metal, a composite material, and/or any other suitable material. Likewise, the additional structures, e.g., the cleats 25, 35 and/or the ring 30 may be made of these or any other suitable materials. However, for these elements, it may be preferable to provide actual components used, e.g., on a boat, to allow for a more realistic practice experience.

Although the illustrated example is particularly well-suited for being supported in a user's lap, it should be understood that the apparatus 5 may be mounted, e.g, to a countertop or other flat surface. Further, the apparatus 5 may be hingedly mounted to allow the apparatus 5 to be folded away (e.g., into a vertical wall) for space efficiency and/or aesthetic purposes.

Figure 6:
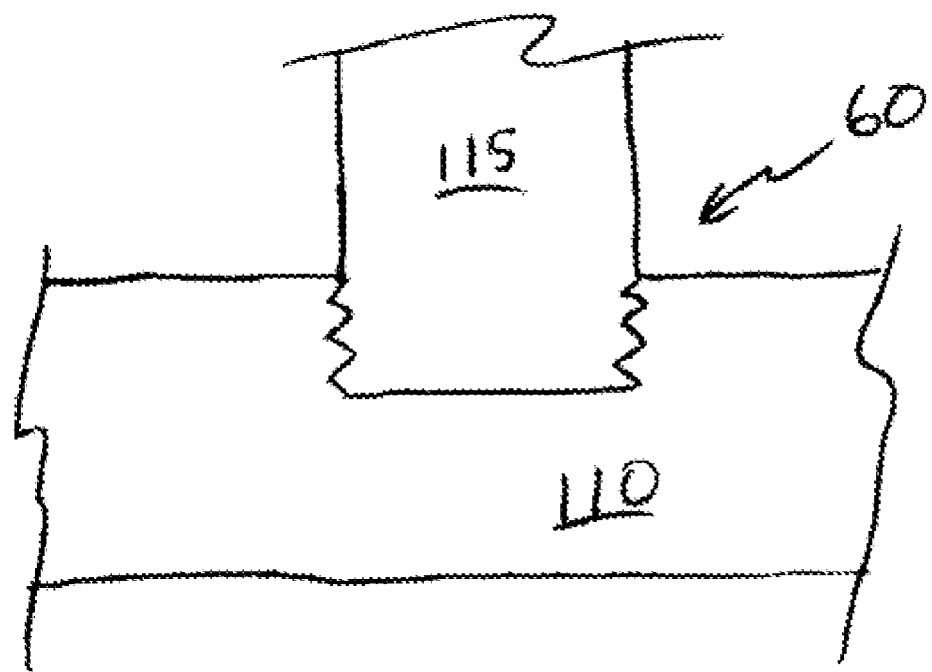
FIG. 6 is cross-sectional view through a threaded connection between a post and a recess of a base board.

Referring to FIG. 6, a threaded interface 60 is shown between a recess in a base board 110 and a post 115. As illustrated, the lower portion of the post 115 has external threads that engage with internal threads of the recess in the base board 115. It should be understood, however, that the base board may be provided with external threads that engage with internal threads of the post 115. The threaded connection described with regard to FIG. 6 may be provided with regard to any one, combination, or all of the posts 15A, 15B, and 15C and the respective recesses of the base board 10. The threaded connection may allow for a detachable connection between the post(s) and the base board. This may be provided where, e.g., the board and/or posts are formed of any suitable material, e.g., injection-molded plastic, wood, or metal. For the posts 15B and 15C, the rotational installation into the recesses with the threaded connection may cause the through-holes to rotate accordingly. Thus, the crossbar may be provided in multiple pieces that mate when both of the posts 15B and 15C are fully screwed into their installed positions.

The apparatus 5 described herein, as well as other example embodiments, provides a practice device that allows a variety of different, realistic structures to be utilized when practicing knot-tying in a compact arrangement that may be portable if desired. This allows practice even when a user may not have access to the actual structure (e.g., boat or dock) to which the knots are typically tied. Moreover, for those who would experience embarrassment when practicing in public areas, the apparatus 5 is easily used in a private setting, e.g., in one's home, office, and/or the interior of a boat.

It should be understood that there exist implementations of other variations and modifications of the invention and its various aspects, as may be readily apparent to those of ordinary skill in the art, and that the invention is not limited by specific embodiments described herein. Features and embodiments described above may be combined in various ways. It is therefore contemplated to cover any and all modifications, variations, combinations, or equivalents that fall within the scope of the basic underlying principals disclosed or claimed herein.

What is claimed is:

1. An apparatus for practicing tying knots, comprising:
a base board having a horizontal upper surface;
a first post coupled to the board and extending upwardly from the horizontal upper surface;
a second post coupled to the board and extending upwardly from the horizontal upper surface;
a crossbar extending laterally from the first post to the second post;
a rope having a first end secured to the base board and second end that is free to allow the rope to be tied to one or more of the first and second posts; and
a third post coupled to the board and extending upwardly from the horizontal upper surface, the third post being separate from the first and second posts.

2. The apparatus of claim 1, further comprising a boat cleat mounted to the upper surface of the base board.

3. The apparatus of claim 1, further comprising a second rope in addition to the first rope, the second rope having a first end secured to the base board and second end that is free to allow the second rope to be tied to one or more of the first and second posts.

4. The apparatus of claim 1, further comprising a boat cleat coupled to a first side surface of the third post.

5. The apparatus of claim 4, further comprising a ring mounted to a second side surface of the third post.

6. The apparatus of claim 5, wherein the first side surface and the second side surface are disposed on opposite sides of the third post.

7. The apparatus of claim 1, wherein the first, second, and third posts are detachably coupled to the base board by inserting bottom portions of the first, second, and third posts into respective first, second, and third recesses in the upper surface of the base board.

8. The apparatus of claim 7, wherein the first, second, and third posts are interchangeable among each of the first, second, and third recesses.

9. The apparatus of claim 1, wherein an upper section of the third post includes a circumferential recess having a diameter that is less than the diameters of immediately adjacent portions of the third post.

10. The apparatus of claim 1, wherein the first and second posts are detachable from the base board.

11. The apparatus of claim 10, wherein the first and second posts are detachably coupled to the base board by a threaded connection.

12. The apparatus of claim 10, wherein the first and second posts are detachably coupled to the base board by inserting bottom portions of the first and second posts into respective first and second recesses in the upper surface of the base board.

13. The apparatus of claim 1, wherein the first post includes a first through-hole and the second post includes a second through-hole, the crossbar extending through the first through-hole and the second through-hole.

14. The apparatus of claim 1, wherein each of the posts has a portion that is circular in horizontal cross-section.

15. The apparatus of claim 14, wherein each of the posts has a portion that is rectangular in horizontal cross-section.

16. The apparatus of claim 15, wherein the portion that is rectangular in cross section is square in cross-section.

17. The apparatus of claim 1, wherein the base board has a bottom surface having a pair of spaced-apart, curved recesses that extend from a front face of the base board toward a rear face of the base board.

18. The apparatus of claim 17, wherein the curved recesses extend fully from the front face of the base board to the rear face of the base board.

19. An apparatus for practicing tying knots, comprising:
a base board having a horizontal upper surface;
a first post coupled to the board and extending upwardly from the horizontal upper surface;
a second post coupled to the board and extending upwardly from the horizontal upper surface;
a crossbar extending laterally from the first post to the second post; and
a rope having a first end secured to the base board and second end that is free to allow the rope to be tied to one or more of the first and second posts;
wherein an upper section of the first vertical post includes a circumferential recess having a diameter that is less than the immediately adjacent portions of the first post, and an upper section of the second post includes a circumferential recess having a diameter that is less than the immediately adjacent portions of the second post.

20. An apparatus for practicing tying knots, comprising:
a base board having a horizontal upper surface;
a first post coupled to the board and extending upwardly from the horizontal upper surface;
a second post coupled to the board and extending upwardly from the horizontal upper surface;
a crossbar extending laterally from the first post to the second post; and
a rope having a first end secured to the base board and second end that is free to allow the rope to be tied to one or more of the first and second posts;
wherein the first post includes a first through-hole and the second post includes a second through-hole, the crossbar extending through the first through-hole and the second through-hole;
wherein crossbar includes opposite end portions each of which extends beyond a respective one of the first and second through-holes to form opposite cantilevered projections extending from the first and second posts.

* * * * *